(12) United States Patent
Florescu

(10) Patent No.: US 6,561,851 B2
(45) Date of Patent: May 13, 2003

(54) MODULE INTERFACE FOR PC CARD

(75) Inventor: Danut Florescu, Burnaby (CA)

(73) Assignee: Sierra Wireless Inc., Richmond British Columbia (CA)

( * ) Notice: Subject to any disclaimer, the term of this patent is extended or adjusted under 35 U.S.C. 154(b) by 0 days.

(21) Appl. No.: 09/844,486

(22) Filed: Apr. 27, 2001

(65) Prior Publication Data

US 2002/0160661 A1 Oct. 31, 2002

(51) Int. Cl.[7] ............................................... H01R 24/00
(52) U.S. Cl. .................................... 439/630; 439/159
(58) Field of Search .......................... 439/630, 945, 439/159, 160, 155, 76.1; 361/737; 235/441, 475

(56) References Cited

U.S. PATENT DOCUMENTS

| 6,053,748 | A |   | 4/2000  | Bricaud et al. |         |
|-----------|---|---|---------|----------------|---------|
| 6,075,706 | A |   | 6/2000  | Learmonth et al. |       |
| 6,132,223 | A | * | 10/2000 | Seeley et al.  | 439/76.1 |
| 6,174,180 | B1| * | 1/2001  | Chen           | 439/159 |
| 6,264,506 | B1| * | 7/2001  | Yasufuku et al.| 439/638 |

* cited by examiner

Primary Examiner—Tho D. Ta
Assistant Examiner—Ross Gushi
(74) Attorney, Agent, or Firm—Thelen Reid & Preist LLP

(57) ABSTRACT

A PC card which releasably engages with a SIM card is provided. The PC card includes a SIM carriage having an ejection assembly and a locking mechanism. The ejection mechanism allows for insertion of the SIM card within the SIM carriage. The locking mechanism locks the SIM card within the SIM carriage upon insertion of the card within the SIM carriage. Additionally, the ejection assembly automatically ejects the SIM card from the SIM carriage upon de-activation of the locking mechanism. The ejection assembly automatically ejects the SIM card with an ejection spring. The orientation of the SIM carriage within the PC card maintains the structural integrity of the PC card. Moreover, the simple configuration of the SIM carriage increases the overall reliability of PC cards which releasably engage SIM cards.

1 Claim, 4 Drawing Sheets

MODULE INTERFACE FOR PC CARD

BACKGROUND OF THE INVENTION

1. Field of the Invention

The present invention relates generally to PC cards and more particularly to PC cards configured to hold subscriber identity module (SIM) cards.

2. Description of Related Art

Today, users reliance on wireless communication continues to steadily increase. This reliance includes the use of wireless communication with laptop computers. These laptop computers have the ability to send and receive data, such as files and other attachments, using wireless PC cards such as wireless modems. The wireless PC cards typically used in wireless communication applications include a subscriber identity module (SIM) card.

The SIM card, which is interchangeable with PC cards, contains data specific to a user such as a telephone number, other telephone numbers which the user may contact and the like. A user may replace a SIM card in a PC card with another SIM card, as described in U.S. Pat. No. 6,053,748 ('748). As shown therein, a PC card 30 is configured to hold a small smart card C. In the '748 patent, the PC card 30 includes upper and lower half-shells 32,34 and an insertion slot 80 which attaches to the PC card 30 with a hinge. The smart card C fits into the PC card 30 through the insertion slot 80 when the insertion slot is an open position. Therefore, in order to place a smart card C into the PC card 30, a user opens the insertion slot 80 and slides the smart card C through the insertion slot 80.

In order to eject the smart card C from the PC card 30, a user inserts an implement, such as a toothpick, into a notch 114. Upon insertion of the implement, a user pushes the smart card C within the PC card 30 until a portion of the smart card C protrudes from the insertion slot 80. Upon protrusion, the user manually pulls the smart card C from the PC card 30 since the PC card 30 lacks the capability to automatically eject the smart card C from the PC card 30.

As may be appreciated, the application of the implement through the notch 114 may damage internal components of the PC card if the user is not careful upon insertion of the implement. In addition, the PC card 30 does not provide a way to automatically eject the smart card C from the PC card 30. Furthermore, the hinged configuration of the insertion slot 80 unnecessarily complicates the overall design of the PC card in that the hinge may fail, thereby decreasing the overall reliability of the PC card 30. The configuration of the PC card 30 also reduces the overall structural integrity of the PC card 30 since the insertion slot 80 and the notch 114 allow flexing of the PC card 30 during normal usage of the PC card 30. Moreover, the insertion slot 80 and the notch 114 do not allow the PC card 30 to remain leak-proof. During normal usage of the PC card 30, moisture may seep through the insertion slot 80 into the PC card 30, thereby possibly damaging the smart card C and the PC card 30.

In addition to '748, U.S. Pat. No. 6,075,706 ('706) discloses a PC card 10 which allows for removal of a chip card 20. The PC card 10 of '706 includes a top portion 86 having an aperture 24 for passage of the chip card 20 onto a frame 22 within the PC card 10. The frame 22 mounts below the top portion 86 and a lid 26, which slides on rails 28 of the frame 22, closes upon insertion of the chip card 20. The configuration of the frame 22 allows fitment of the chip card 20 within the frame 22.

In order to place the chip card 20 into the PC card 10, a user slides the lid 26 into an open position and drops the chip card 20 into the frame 22. After dropping the chip card 20 into the frame 22, the user slides the lid 26 into a closed position. If the user decides to remove the chip card 20 from the PC card 10, the user slides the lid 26 into the open position, reaches into the PC card 10 and pulls the chip card 20 out of the frame 22 and out of the PC card 10.

As users will appreciate, the PC card 10 does not provide a way to automatically eject the chip card 20 from the PC card 10. Instead, a user must physically reach into the PC card 10 and extract the chip card 20 from the PC card 10. The small size of the chip card 20 makes retrieval through the aperture 24 extremely difficult, requiring a great amount of care on the users's part to avoid damaging both the chip card 20 and the PC card 10 during extraction of the chip card 20. The lid 26, the rails 28 and the frame 22 also increase the overall complexity of the PC card 10, thereby decreasing the reliability of the PC card 10 since the added complexity increases the possibility of failure.

In addition, the aperture 24 compromises the structural integrity of the PC card 10. The aperture decreases the overall rigidity and the ability of the PC card 10 to resist flexing from external stresses that may be placed on the PC card 10. As a result, the overall reliability of the PC card 10 reduces due to the weakness of the overall structure of the PC card 10 resulting from the aperture 24. Moreover, the aperture 24 does not allow the PC card 10 to remain leak-proof. Thus, moisture may seep into the PC card 10 via the aperture 24, thereby increasing the possibility of damage to the chip card 20 and the PC card 10. In addition to allowing the possibility of moisture admittance, the relatively large size of the aperture 24 allows radio frequency (RF) emissions from the PC card 10. Therefore, the PC cards described in '748 and '706 do not present an attractive solution to a user wishing to use a PC card having the capability to insert and remove small electronic cards such as the chip card 20 due to the complexity and unreliability of the PC cards 10 and 30.

Therefore, a need to exists to provide a PC card which allows for insertion and removal of electronic cards from the PC card. The new device should allow for easy insertion and removal of electronic cards from the PC card while maintaining overall structural integrity of the PC card. In addition, this new device should provide automatic ejection of electronic cards from the PC card while minimizing the amount of parts present in the PC card.

BRIEF SUMMARY OF THE INVENTION

The present invention fills the aforementioned needs by providing a PC card which releasably engages a SIM card. The PC card allows for easy insertion and automatic removal of a SIM card from the PC card.

In one embodiment of the present invention, a PC card which releasably engages of a subscriber identity module (SIM) card is disclosed. The PC card comprises a connector at a first end and a SIM carriage at an end opposite the connector. The connector facilitates connectivity between the PC card and a module such that the PC card provides communication capability to the module. The configuration of the SIM carriage allows releasable engagement of the SIM card with the PC card. The SIM carriage provides connectivity to allow communication between the SIM card and the PC card. The SIM carriage includes a sleeve, a locking mechanism and an ejection assembly. The sleeve holds the SIM card when the SIM card inserts into the SIM carriage. Upon insertion into the sleeve, the locking mechanism secures the SIM card with the SIM carriage and the PC card. When a user deactivates the locking mechanism, the ejection assembly automatically ejects the SIM card from the SIM carriage and the PC card.

In another embodiment of the present invention, a SIM carriage for engaging a SIM card with a PC card is disclosed. The PC card includes a connector located at an end opposite the location of the SIM carriage within the PC card such that the orientation minimizes the loss of structural integrity and rigidity of the PC card. The SIM carriage includes an ejection assembly, a sleeve and a locking mechanism. The ejection assembly allows for insertion of the SIM card within the sleeve. The sleeve holds the SIM card within the SIM carriage such that the SIM card engages with the PC card. Upon insertion of the SIM card within the sleeve, the locking mechanism secures the SIM card with the SIM carriage. Upon deactivation of the locking mechanism, the ejection assembly automatically ejects the SIM card from the SIM carriage.

In a further embodiment of the present invention, a PC card for providing communication capability to a module is disclosed. The PC card comprises a connector at a first end and a SIM carriage at an end opposite the connector. The connector establishes connectivity between the PC card and the module such that the PC card provides communication capability to the module. The configuration of the SIM carriage provides connectivity between a SIM card and the PC card. In order to provide connectivity between the SIM card and the PC card, the SIM carriage includes a locking mechanism and an ejection assembly. The locking mechanism secures the SIM card with the SIM carriage and the PC card. The ejection assembly automatically ejects the SIM card from the SIM carriage and the PC card when a user disengages the locking mechanism.

Therefore, as may be appreciated, the present invention provides a PC card which releasably engages a SIM card. The present invention provides a SIM carriage which automatically ejects a SIM card, thereby avoiding the possibility of damaging the PC card which may arise when a user manually ejects the SIM card from the PC card. Moreover, the configuration of the SIM carriage within the PC card, where the location of the connector is opposite to the location of the SIM carriage within the PC card, minimizes the loss of structural integrity and rigidity of the PC card, thereby increasing the reliability of the PC card.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements and wherein.

DETAILED DESCRIPTION OF THE INVENTION

The present invention is a PC card having a subscriber identity module (SIM) carriage which releasably engages a SIM card with the PC card. As an overview, in accordance with an embodiment of the present invention, the SIM carriage allows for releasable engagement of the SIM card with the PC card. The SIM carriage includes both an ejection assembly and a locking mechanism. The ejection mechanism allows for insertion of the SIM card within the SIM carriage and automatic ejection of the SIM card from the SIM carriage. The locking mechanism secures the SIM card within the SIM carriage upon insertion of the SIM card within the SIM carriage. Therefore, a user may insert the SIM card into the PC card and eject the SIM card upon usage from the PC card, as will be discussed in greater detail with respect to the accompanying Figures.

Figure 1:
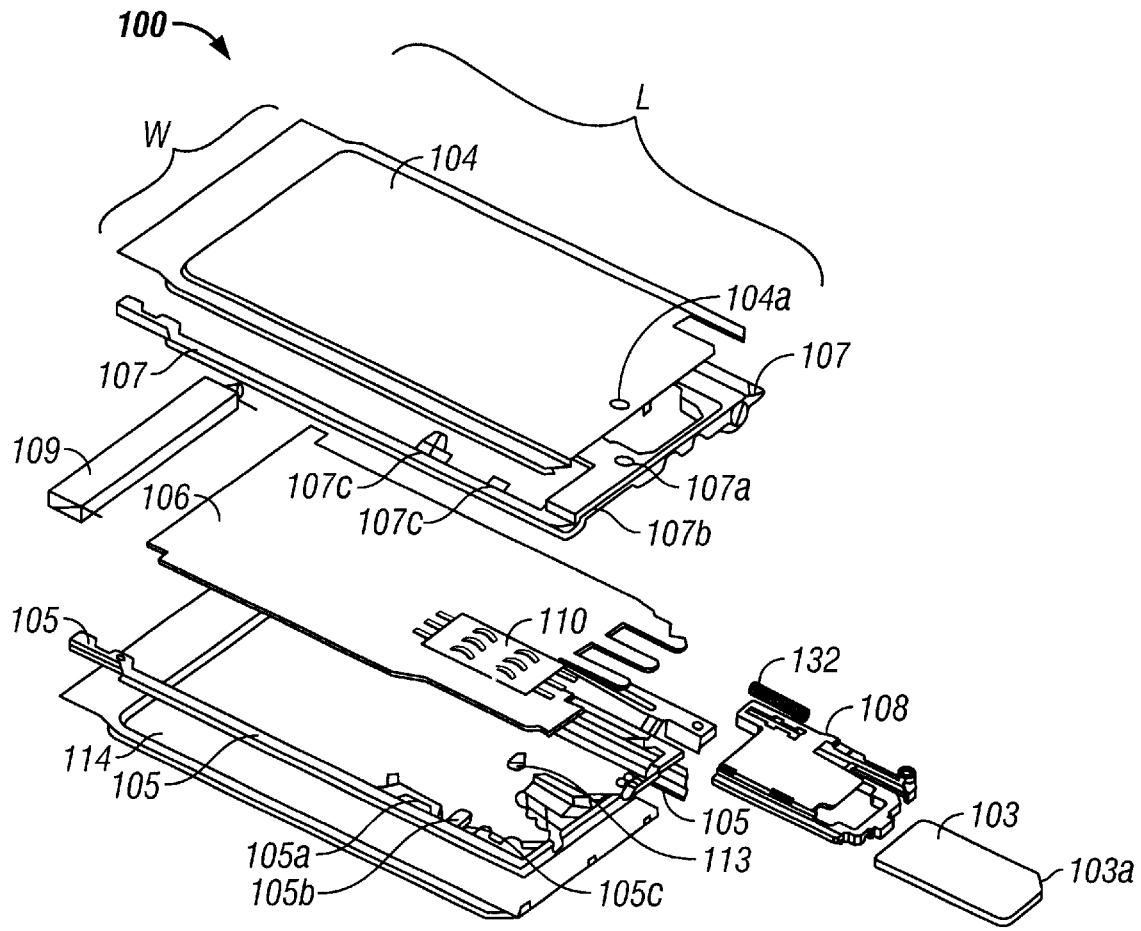
FIG. 1 illustrates an exploded perspective view of a PC card in accordance with one embodiment of the present invention.

Now making reference to the Figures, and more particularly FIG. 1, FIG. 1 illustrates a perspective view of a PC card 100 in accordance with one embodiment of the present invention. The PC card 100 may be any standard PCMCIA card capable of supporting a range of communication protocols, including cellular digital packet data (CDPD), code-division multiple access (CDMA), general packet radio services (GPRS), universal mobile telecommunications system (UMTS) or the like. In one embodiment of the present invention, the PC card 100 may be an AirCard300™ available from Sierra Wireless of Richmond, British Columbia, Canada. The PC card 100 includes a top case defined by both a top housing 104 and a frame 107, a printed circuit board (PCB) 106 and a bottom case defined by both a bottom housing 114 and a frame 105. In an embodiment of the present invention, both the top housing 104 and the bottom housing 114 are constructed of sheet metal. The PCB 106 is a printed circuit board which provides an electronic interface between the PC card 100 and the SIM card 103. Moreover, PCB 106 includes the necessary circuitry, such as modem functionality, for the PC card 100. Besides providing the necessary circuitry for the PC card 100, the PCB 106 also couples a contact 110 with the PC card 100.

Figure 2:
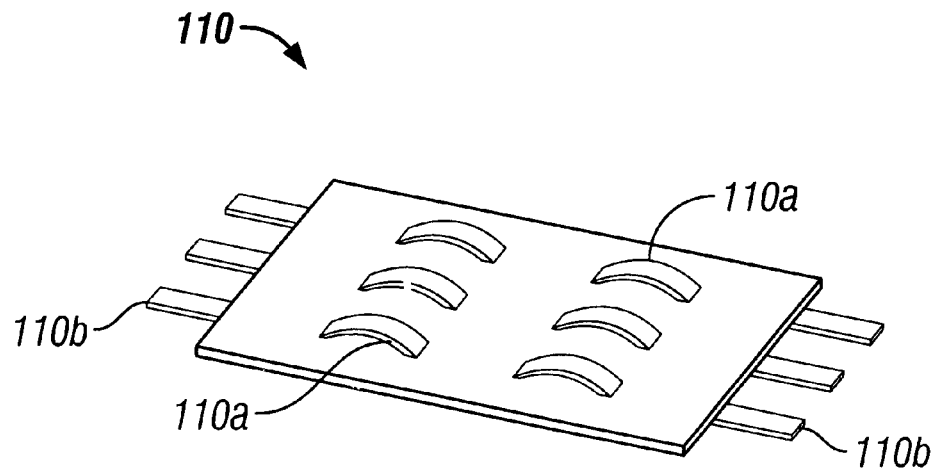
FIG. 2 is an embodiment of the present invention illustrating a perspective view of a contact shown with respect to FIG. 1.

The contact 110 rigidly attaches to the PCB 106 such that the contact 110 remains stationary during engagement of the SIM card 103 with a SIM carriage 108. The contact 110 rigidly attaches to the PCB 106 using any suitable technique, including soldering PCB contacts 110b (shown with reference to FIG. 2) to the PCB 106 or the like. In one embodiment of the present invention, the contact 110 may be any device suitable for providing connectivity between a SIM card and a printed circuit board, such as a SCG-SS6A-1416-TB connector available from Japan Solderless Terminals, located in Waukegan, Ill., or the like. The contact 110 allows communication between a SIM card 103 and the PC card 100. As shown in greater detail with respect to FIG. 2, the contact 110 includes SIM contacts 110a and the PCB contacts 110b. The SIM contacts 110a provide connectivity between the contact 110 and the SIM card 103. The SIM contacts 110a engage with contacts on the SIM card 103 (not shown) as the SIM card 103 inserts into the SIM carriage 108. The PCB contacts 110b provide connectivity between the contact 110 and the PCB 106. Therefore, the contact 110 facilitates communication between the SIM card 103 and the PCB 106.

Turning back to FIG. 1 and the PC card 100 shown with respect to FIG. 1, the bottom case includes the frame 105. In accordance with an embodiment of the present invention, the frame 105 may be constructed out of plastic using an injection molding process. In this embodiment, the injection molding process forms the frame 105 onto the bottom housing 114 in order to form the bottom case. The frame 105 also couples the SIM carriage 108 with the PCB 106 and secures the SIM carriage 108 within the PC card 100. When the SIM carriage 108 couples with the frame 105, legs 101a through 101c (shown with reference to FIG. 3C) couple with grooves 105a through 105c of the frame 105.

As may be seen with reference to FIG. 1, in this embodiment of the present invention, the SIM carriage 108 is located at an end opposite a connector 109 within the PC card 100 such that the SIM carriage 108 does not compromise the structural integrity of the PC card 100. To further illustrate, dimensions W and L define the PC card 100, where the dimension L is longer in length than the dimension W. The SIM carriage 108 and the connector 109 are located on sides of the PC card 100 defined by the dimension W. As a result of having the SIM carriage 108 on a side of the PC card 100 defined by the dimension W, the orientation of the SIM carriage 108 within the PC card 100 does not compromise the structural integrity of the PC card 100. As previously discussed with reference to the prior art, the orientation of prior art SIM carriages within PC cards reduced the overall structural integrity and rigidity of the PC cards using the SIM carriage. The orientation of the SIM carriage 108 within the PC card 100 minimizes losses of structural integrity and rigidity of the PC card 100, thereby increasing the ability of the PC card 100 to resist flexing during handling of the PC card 100 (i.e., insertion into a laptop computer, insertion into a personal data assistant (PDA), etc.)

The PC card 100 communicates with a module, such as a laptop computer, via the connector 109. In one embodiment of the present invention, the connector 109 may be an expansion slot which facilitates coupling of the PC card 100 with a module. Additionally, the connector 109 provides connectivity between the PC card 100 and the module such that the module uses the PC card 100 to communicate with other devices.

Figure 3A:
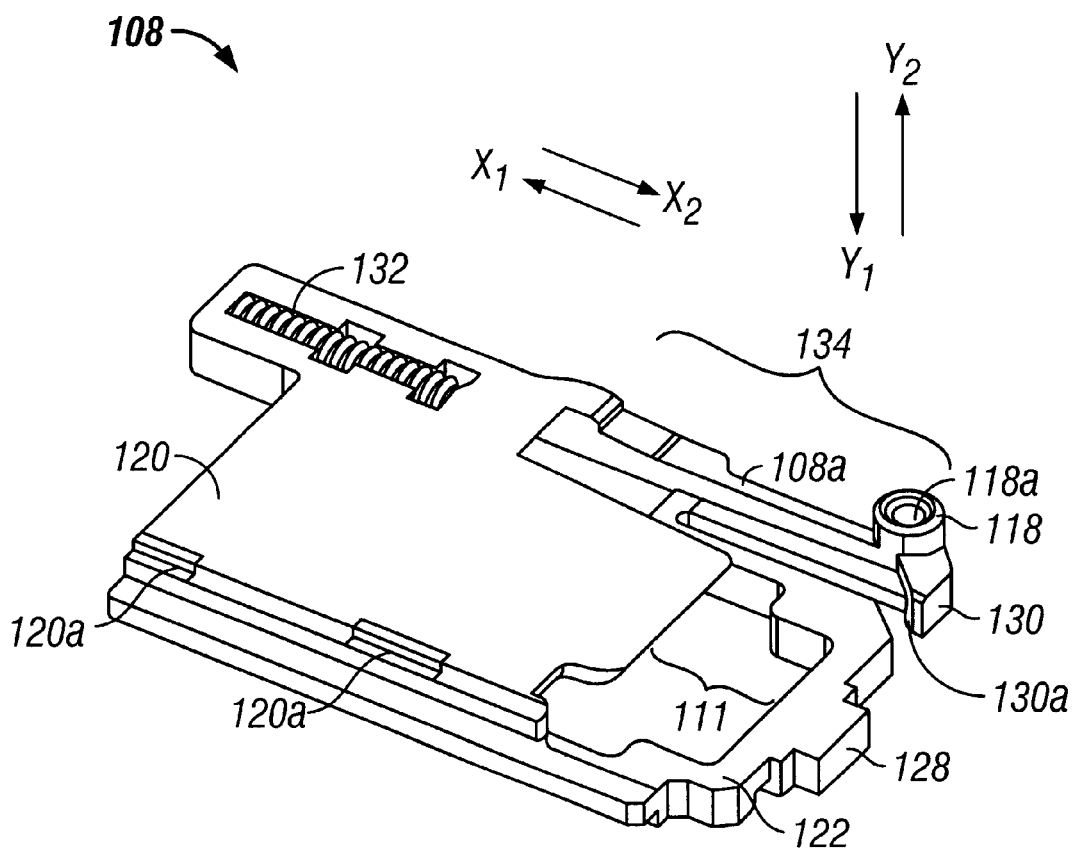
FIG. 3A is an embodiment of the present invention illustrating a perspective view of the SIM carriage shown with reference to FIG. 1.

Now making reference to FIG. 3A, FIG. 3A is an embodiment of the present invention illustrating a perspective view of the SIM carriage 108 shown with respect to FIG. 1. The SIM carriage 108 includes a frame 122 and an upper portion 120. The frame 122 and the upper portion 120 form a sleeve 111. The SIM card 103 inserts between the frame 122 and the upper portion 120, as shown with reference to FIG. 4. The SIM carriage 108 also includes an insertion/ejection assembly 134 which comprises a tab 118, a notch 118a within the tab 118 and an arm 108a. The insertion/ejection assembly 134 also includes a locking mechanism 130 having a surface 130a.

It should be noted that in one embodiment of the present invention, the tab 118 pliably couples with the SIM carriage 108 via the arm 108a. Therefore, in order to allow pliable coupling of the tab 118 with the SIM carriage 108 via the arm 108a, the SIM carriage 108 may be formed from a material suitable for allowing pliability of the SIM carriage 108, such as plastic or the like. Nevertheless, it should be understood that the tab 118 may couple with the SIM carriage 108 using any method which allows movement of the tab 118 in directions $Y_1$ and $Y_2$. The pliability of both the arm 108a and the tab 118 with respect to the SIM carriage 108 allow the tab 118 to move in a downward direction $Y_1$. Moreover, in one embodiment of the present invention, the SIM carriage 108 may be constructed such that the insertion/ejection assembly 134, the arm 108a, the upper portion 120 and the frame 122 are constructed as a single unit. In this embodiment, the SIM carriage may be constructed using any technique suitable forming the SIM carriage into the single unit configuration, such as cast molding, injection molding, or the like.

During insertion of the SIM card 103 into the SIM carriage 108, the insertion/ejection assembly 134 acts as an insertion assembly. During insertion of the SIM card 103, a user moves the tab 118 by moving the notch 118a in a downward direction $Y_1$. It should be noted that the user engages the tab 118 and the notch 118a through the hole 104a in the top housing 104 and a hole 107a in a frame 107. The tab 118 is flush with the top housing 104 such that a user may engage the tab 118 through the hole 104a of the top housing 104. As the tab 118 and the notch 118a move in the downward direction $Y_1$, the locking mechanism 130 and the surface 130a also move in the downward direction $Y_1$. In this embodiment, the locking mechanism 130 rigidly attaches with the tab 118, therefore, as the tab 118 moves in the downward direction $Y_1$, both the locking mechanism 130 and the surface 130a also move in the downward direction $Y_1$. Once the user moves the tab 118 and the locking mechanism 130 in the downward direction $Y_1$, the user inserts the SIM card 103 into the SIM carriage 108.

Figure 3B:
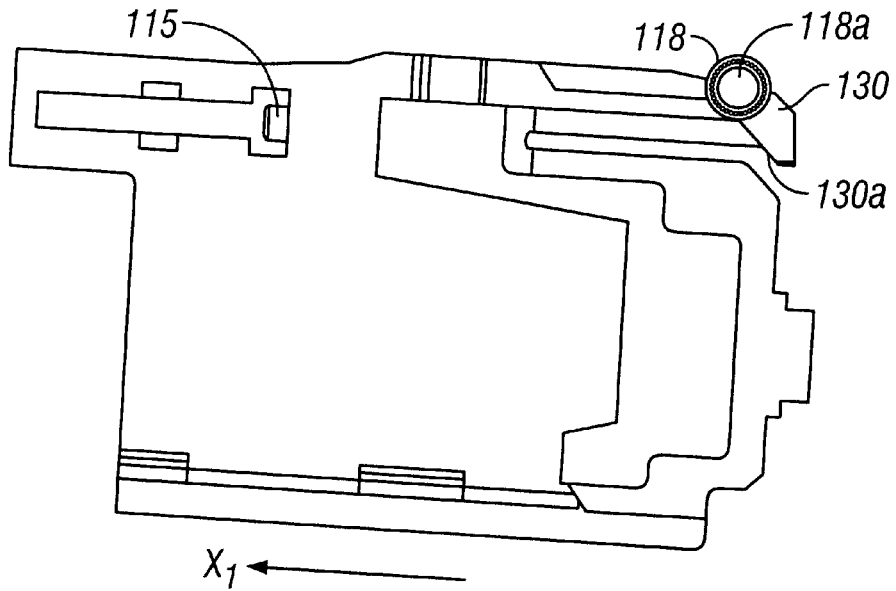
FIG. 3B is an embodiment of the present invention illustrating a top view of the SIM carriage shown with reference to FIG. 3A.
Figure 3C:
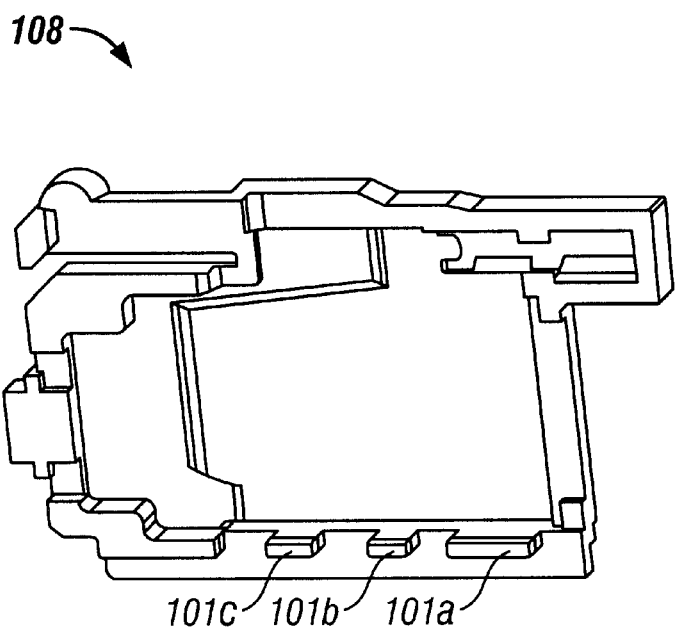
FIG. 3C illustrates a bottom perspective view of the SIM carriage shown with reference to FIG. 1, in accordance with an embodiment of the present invention.

Upon insertion of the SIM card 103 within the SIM carriage 108, the locking mechanism 130 secures the SIM card 103 within the SIM carriage 108. The locking mechanism 130 includes the surface 130a which abuts a surface 103a (shown with respect to FIG. 1) of the SIM card 103 upon insertion of the SIM card 103 within the SIM carriage 108. As the SIM card 103 inserts within the SIM carriage 108, the SIM card 103 compresses an ejection spring 132. As shown with reference to FIG. 3B, the ejection spring 132 fits around a plunger 115 once the ejection spring 132 inserts within the SIM carriage 108. When the SIM card 103 inserts within the SIM carriage 108, the SIM card 103 moves the plunger 115 in a direction $X_1$, as indicated by a directional arrow $X_1$, thereby compressing the ejection spring 132. In an accordance with one embodiment of the present invention, the ejection spring 132 may be any spring suitable for applying a force on the SIM card 103 during ejection of the SIM card 103, such as a compression spring or the like.

Returning attention to FIG. 3A, when a user desires to eject the SIM card 103 from the SIM carriage 108, the user ejects the SIM card 103 from the SIM carriage 108 using the tab 118 and the notch 118a. During ejection of the SIM card 103, the insertion/ejection assembly 134 functions as an ejection assembly, where the ejection assembly comprises the tab 118, the notch 118a and the ejection spring 132. The user pushes the tab 118 in the downward direction $Y_1$ with the notch 118a through the hole 104a. As the tab 118 and the notch 118a move in the downward direction $Y_1$ the locking mechanism 130 and the surface 130a also move in the downward direction $Y_1$. When the surface 130a of the locking mechanism 130 clears the surface 103a of the SIM card 103, the ejection spring 132 ejects the SIM card 103 from the SIM carriage 108 and the PC card 100 by moving the SIM card 103 in a direction indicated by directional arrow $X_2$. It should be understood that the locking mechanism 130 and the surface 130a of the locking mechanism 130 clear the SIM card 103 and the surface 103a when the surface 103a no longer abuts the surface 130a.

Turning attention to the hole 104a (shown with respect to FIG. 1), the hole 104a offers additional advantages to the PC card 100. The configuration of the hole 104a within the PC card 100 ensures that a user will not eject the SIM card 103 from the PC card 100 during operation of the PC card 100. During use of the PC card 100 by a module, such as a laptop computer or a personal data assistant (PDA), the PC card 100 inserts within the module. During insertion of the PC card 100 within the module, the hole 104a also inserts within the module. As such, a user may not engage either the hole 104a or the tab 118 residing within the hole 104a during engagement of the PC card 100 with a module. As such, the possibility of corrupting the SIM card 103 by inadvertently ejecting the SIM card 103 during use of the PC card 100 is averted since a user may not access the hole 104a during usage of the PC card 100.

In addition to preventing corruption of the SIM card 103, the configuration of the hole 104a also minimizes RF emissions from the PC card 100. The hole 104a preferably has a diameter in a range between about 2 mm and about 3 mm and more preferably a diameter of about 2.5 mm. The relatively small size of the hole 104a minimizes RF emissions from the PC card 100. Typically, the PC card operates in a range above 800 MHz. The relatively small size of the hole 104a only allows passage of a minimal amount of RF emissions due to the relatively high frequency of the RF emissions and the small size of the hole 104a.

The SIM carriage 108 also includes a transparent surface 128 as shown with respect to FIG. 3A. The transparent surface 128 allows viewing of a LED 113 (shown with reference to FIG. 1) coupled to the PCB 106. As the SIM carriage 108 couples with the PCB 106 via the frame 105, the LED 113 resides behind the transparent surface 128. Therefore, the transparent surface 128 allows viewing of the LED 113 upon activation of the LED 113. In an embodiment of the present invention, the LED 113 activates during normal operation of the PC card 100. For example, when the PC card 100 transmits data, receives data, powers up or the like, the LED 113 activates to indicate to a user, via the transparent surface 128, the activity of the PC card 100. In one embodiment, the color of the LED 113 indicates the activity of the PC card 100 (i.e., green when transmitting data, red during a failure of the PC card 100, etc.). It should be understood that the configuration of the LED 113 adjacent the transparent surface 128 minimizes the amount of the parts required by the PC card 100. The configuration obviates the need for an additional light pipe or the like which typically are necessary to conduct light from a light source such as the LED 113 to an indicator, such as the transparent surface 128. Therefore, the present invention minimizes the amount of parts necessary for the PC card 100. As such, overall reliability of the PC card 100 increases since fewer parts and assemblies are present which may fail. The SIM carriage 108 also includes grooves 120a which couple with the frame 107 of the PC card 100 upon assembly of the PC card 100, as shown with reference to FIG. 4.

Figure 4:
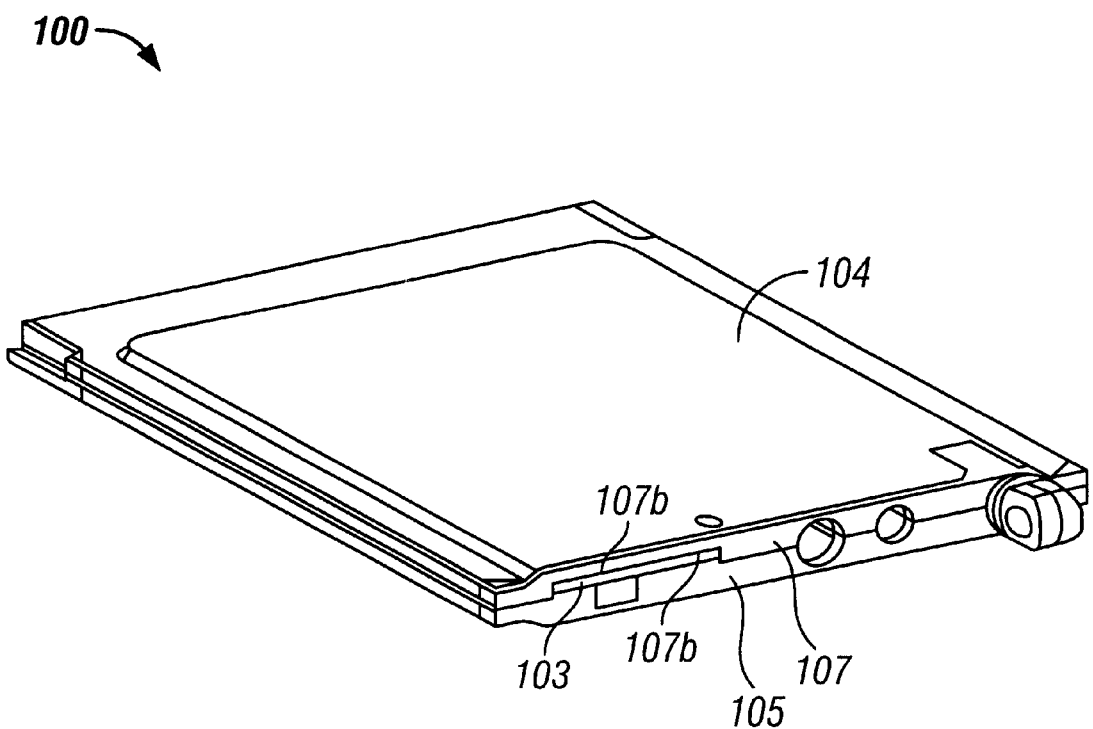
FIG. 4 is a perspective view of an embodiment of the present invention illustrating the frame shown with reference to FIG. 1 holding the SIM carriage.

FIG. 4 is an embodiment of the present invention illustrating a schematic of the PC card 100 shown with reference to FIG. 1. As may be seen with reference to the Figure, upon insertion of the SIM card 103 into the SIM carriage 108 and the PC card 100, the configuration of the frame 107 allows viewing of the SIM card 103 through a recess 107b of the frame 107. As mentioned earlier, the frame 107 couples with the top housing 104 upon assembly of the PC card 100. In an embodiment of the present invention, an injection molding process forms the frame 107 onto the top housing 104 to form the top case. Upon formation of the top case and the bottom case, a sonic welding process couples the top case with the bottom case to form the PC card 100, as shown with reference to the Figure. When the bottom case and the top case couple using ultrasonic welding, the PC card 100 remains leak resistant. The leak resistance increases the overall reliability of the PC card 100 since the PC card 100 is less prone to damage due to moisture leaking into the PC card 100 during normal operation of the PC card 100. In addition, since the top housing 104 and the bottom housing 114 form a metal cage enclosure with the sonic welding process, EMI emissions are minimized from the PC card 100.

The present invention now provides a PC card capable of releasably engaging with a SIM card. The present invention maintains the structural integrity of the PC card as the module inserts into the PC card, thereby minimizing the possibility of damage to both the PC card and the module during use. Likewise, the present invention maintains the dimensional integrity of the PC card. As such, the present invention is compatible with all devices compatible with standard PCMCIA cards, such as a laptop computer, a personal data assistant or the like. In addition, the PC card maintains EMI protection for the modem and module as connectivity is established between the PC card and the module.

Furthermore, the hole used for insertion and ejection of a SIM card from the PC card in the present invention provides many advantages. For example, the relatively small size minimizes RF emissions from the PC card during use as opposed to the larger apertures used in the prior art. The orientation of the hole within the top housing of the PC card also minimizes the possibility of inadvertently ejecting the SIM card from the PC card during operation which may corrupt the SIM card.

As previously described, prior art SIM carriages required complicated assemblies (i.e., lids sliding on rails, sleeves having hinges, etc.) which increased the overall complexity of prior art PC cards. The present invention obviates this problem through the use of a simple pliable arm which allows for insertion and ejection of a SIM card from the PC card. The present further circumvents this problem by avoiding the use of a light pipe with the LED of the PC card. As such, the present invention increases the overall reliability and decreases the costs associated with PC cards having releasably engaging SIM cards, thereby making the present invention an attractive alternative to users.

Moreover, the present invention automatically ejects the SIM card from the PC card. As mentioned earlier, prior art PC cards required that a user manually eject the SIM card from the PC card with an implement which introduced the possibility of damaging both the SIM card and the PC card. The present invention incorporates a simple compression spring which automatically ejects the SIM card from the PC card. Therefore, the ejection spring diminishes the possibility of a user damaging both the SIM card and the PC card during extraction of the SIM card from the PC card.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A PC card for providing communication capability to a module, the PC card comprising:

a connector for establishing connectivity between the PC card and the module, the connector being at a first end of the PC card; and a SIM carriage located at an end opposite the connector, the SIM carriage being configured to hold a SIM card, where the SIM carriage further comprises:

a locking mechanism for securing the SIM card with the SIM carriage and the PC card; and an ejection assembly for automatically ejecting the SIM card from the SIM carriage and the PC card;

a transparent surface viewable by a user; and a LED adjacent the transparent surface such that upon illumination of the LED, the user detects the illumination through the transparent surface.

* * * * *